Feb. 24, 1953 C. T. DALY 2,629,829
METHOD OF CALIBRATING ELECTRIC OSCILLATION GENERATORS
Filed Oct. 22, 1946 2 SHEETS—SHEET 1
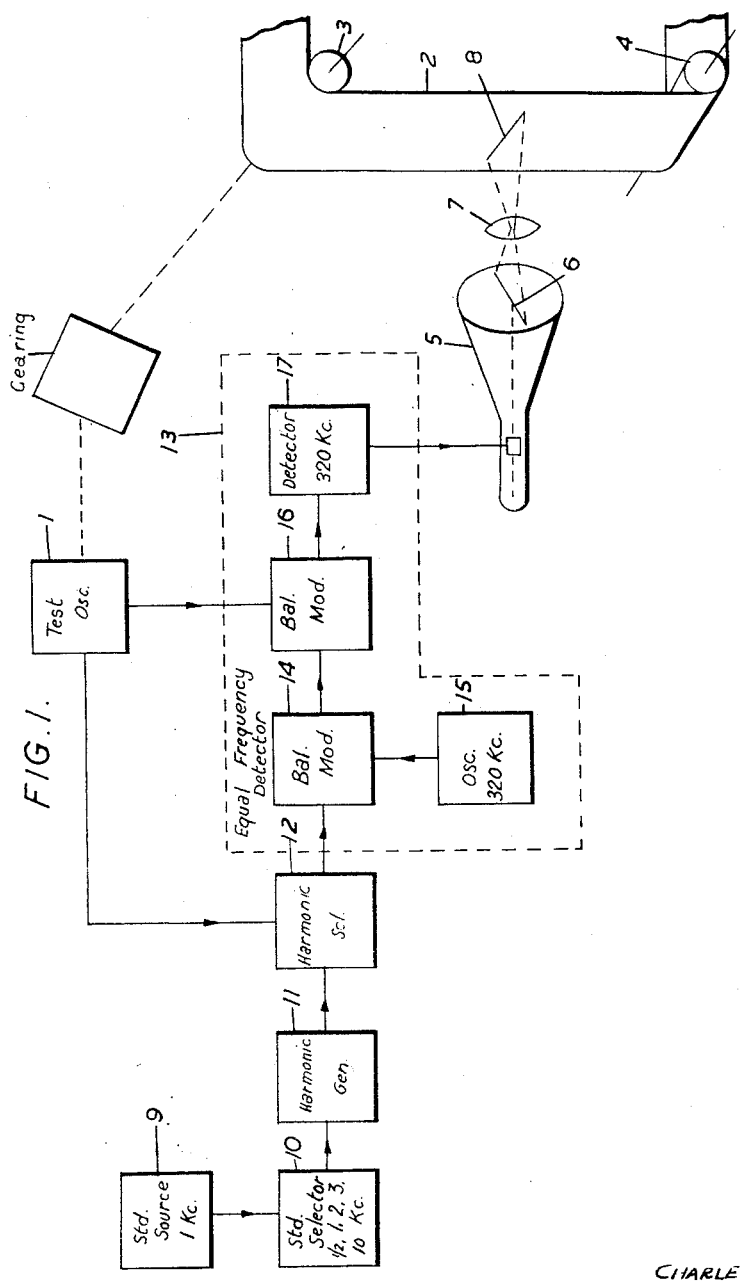
INVENTOR
CHARLES TREVOR DALY
BY Philip M. Bolton
ATTORNEY Feb. 24, 1953 C. T. DALY 2,629,829
METHOD OF CALIBRATING ELECTRIC OSCILLATION GENERATORS
Filed Oct. 22, 1946 2 SHEETS—SHEET 2
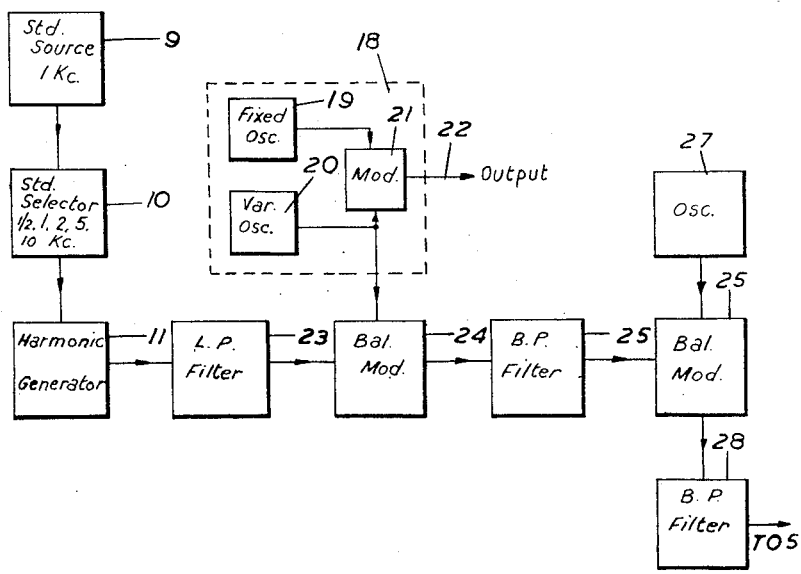
INVENTOR
CHARLES TREVOR DALY
BY Philip M. Bolton
ATTORNEY Patented Feb. 24, 1953

2,629,829

UNITED STATES PATENT OFFICE 2,629,829

METHOD OF CALIBRATING ELECTRIC OSCILLATION GENERATORS

Charles Trevor Daly, London, England, assignor to International Standard Electric Corporation, New York, N. Y.

Application October 22, 1946, Serial No. 704,957
In Great Britain August 3, 1945

Section 1, Public Law 690, August 8, 1946
Patent expires August 3, 1965

6 Claims. (Cl. 250—36)

The present invention relates to the calibration and graduation of the scales of electrical instruments, with particular though not exclusive reference to wide range variable frequency oscillators.

In the case of electrical instruments which have to be accurately calibrated and graduated at a large number of points on the scale, the cost of the graduation process is frequently an undesirably large fraction of the whole cost of the instrument, and may demand the employment of skilled labour. This is particularly the case in connection with wide range variable frequency oscillators, the accurate calibration and graduation of which presents a troublesome problem.

It is the principal object of the present invention to reduce the cost of calibrating and graduating electrical instruments, such as variable frequency oscillators, and to replace the methods commonly employed hitherto by a rapid automatic method which can be operated by unskilled labour.

Accordingly the invention provides an arrangement for graduating an electrical instrument having a photographically sensitised scale, comprising a cathode ray oscillograph, means for producing a line trace on the oscillograph screen, and means for producing a photographic image of the line trace on the said scale at a position corresponding to a specified value of the electrical quantity to be indicated by the said scale.

In order to illustrate the invention two arrangements for calibrating a variable frequency oscillator will be described with reference to Figures 1 and 2, respectively, of the accompanying drawings which show block schematic circuit diagrams of the arrangements. In order to make the process clear, a particular numerical example will be explained, but it will, of course, be understood that the same arrangement can be used for other values. The oscillator will be assumed to be of the kind in which the scale consists of a length of cinematograph film which is coupled to the variable element which determines the frequency (usually a variable air condenser), which film has to be marked with graduation lines corresponding to specified frequencies. It will also be assumed that the oscillator has a range from a few hundred cycles per second to 150 kilocycles per second (kc.).

Referring to Figure 1, the oscillator to be calibrated and graduated is represented by the block 1, but its scale is shown separately at 2 and consists of a sensitised cinematograph film which runs over rollers or sprockets 3 and 4. The film is driven by suitable mechanical gearing (not shown) coupled to the variable condenser or other element which determines the frequency of the oscillator 1.

A cathode ray tube 5 of conventional pattern is arranged to produce a horizontal line trace at 6 when the oscillator frequency coincides with one of the selected calibration frequencies. The manner in which this is done will be explained fully below. The trace 6 is focussed upon the film 2 by suitable lens system 7, not shown in detail, producing a horizontal optical image 8 on the sensitised film 2. It is, of course, understood that appropriate means (not shown) will be provided to exclude stray light during the calibration process. In order to graduate the film, the variable condenser or other element of the oscillator is set at one end of its range and is then steadily rotated or otherwise adjusted to the other end of the range, carrying the film 2 with it. Every time the oscillator frequency coincides with one of the selected calibration frequencies, a line trace is suddenly produced on the oscillograph screen and is simultaneously photographically registered on the film 2 at the right place. After development, the film will be found to bear a complete series of graduations corresponding to the selected frequencies. The above is a brief outline of the process, and it will be appreciated that the graduation of the scale is entirely automatic, and errors resulting from the separate adjustment of the frequency and subsequent mechanical marking of the film, which were necessary according to the conventional process, are eliminated. It will be evident that if desired, the rotation of the variable condenser or other element could be effected by an electric motor, for example, by which means the speed of the process could be accurately regulated. In such case the operator would need only to set up the apparatus for test according to simple mechanical instructions, and would not require to have any particular skill.

The arrangements for obtaining the trace on the oscillograph screen are shown in Figure 1. A standard frequency source 9 supplies a master standard frequency of 1 kc. to a standard frequency selector 10 which comprises multiplying and dividing circuits of conventional type adapted to derive standard frequencies of ½, 1, 2, 5 and 10 kc. from the 1 kc. master standard. One of these standard frequencies is selected (according to the interval desired between the selected graduation frequencies) and is applied to a harmonic generator 11 which is adapted to produce all the harmonics of the selected standard frequency up to say 150 kc. at the same output level. These harmonics serve as calibration frequencies for the oscillator. It will be assumed that the ½ kc. standard has been selected.

The harmonics generated by the generator 11 (which in the example chosen consist of a complete series of calibration frequencies separated by 500 cycle intervals) are applied to a harmonic selector 12 to which is also applied some of the output from the oscillator 1. The harmonic selector 12 is preferably of the type described with reference to Figure 1 of the specification of copending British application No. 13,496/44. This consists of a device which will select that one of the harmonics which has the same frequency as the frequency of the oscillator 1, and gives substantially no output except when the coincidence of the two frequencies is relatively close.

The harmonic so selected is then passed to an equal frequency detector, which is a device which indicates when two frequencies separately applied thereto are equal. This device preferably (though not essentially) consists of the elements shown in Figure 1 enclosed in the dotted outline 13, but other types of equal frequency detectors are known. These elements comprise a balanced modulator 14 of the suppressed carrier type, having a local oscillator 15 giving a fixed frequency F, which should preferably be at least double the highest frequency generated by the test oscillator 1, in order to prevent interference by the second harmonic of the oscillator frequency. It may be desirable in any case to connect a low pass filter (not shown) to the output of the oscillator 1, which filter is designed to cut off just above the highest frequency of the range. In the particular case cited as an example, the frequency F may be 320 kc., and the cut off frequency of the filter may be 200 kc. The harmonic of frequency $f$ (100 kc. for example) selected by the harmonic selector 12 is applied to the balanced modulator 14 from the output of which are obtained sideband frequencies $F+f$ and $F-f$, which in turn are applied to a second balanced modulator 16 of the same type as the first, for which the test oscillator 1 is used as the local oscillator. If the frequency of the test oscillator be slightly incorrect, say $f+df$, then the side band frequencies obtained at output of the modulator 16 will be:

$F+2f+df$     $F+2f+df$
$F+f$     $F+f$
$F+df$     $F+df$

These frequencies are supplied simultaneously to a highly selective filtering device 17 tuned to the frequency F (320 kc.), so that only when the frequency of the oscillator 1 is accurately adjusted to the frequency $f$ (in other words, $df=0$), output is obtained from the detector 17 and is applied to the horizontal deflecting plates of the oscillograph 5. It will thus be understood that on the adjustment of the oscillator 1, the harmonic selector 12 is first caused to select the harmonic of frequency $f$ which is nearest to the frequency which the oscillator is generating, and then as the adjustment proceeds, the filtering device 17 suddenly gives output when the oscillator frequency is very closely equal to $f$, which is an exact multiple of the standard frequency. At the same time as the correct adjustment of the oscillator is reached, the corresponding graduation is photographically marked on the film 2 in the manner explained.

The selectivity of the filter 17 should be within the allowable calibration error of the oscillator. For example, if the accuracy of setting of the oscillator is to be within ± 10 cycles per second, the filter 17 should give a considerably reduced output when $df$ is ± 5 cycles, for example. For this reason the filter should preferably comprise a quartz crystal resonator, and may include frequency changing means to enable a crystal of convenient dimensions to be used. The resonance frequency of the crystal should, however, not be too low, otherwise the time of response may be too great.

The oscillator 15 should preferably have a frequency adjustment over a small range, in order that its frequency may be brought accurately into agreement with the resonance frequency of the filter 17. This preliminary adjustment may be made by directly connecting the oscillator to the filter and adjusting for maximum output.

It will, of course, be understood that the desired graduation frequency intervals may not be the same in different parts of the frequency range. In this case the standard frequency given by the selector 10 will have to be changed to correspond with the change in the frequency interval. Details of such an arrangement will be well understood by those skilled in the art.

It will be clear that as the output frequency of the oscillator 1 passes through the graduation value, the output from the filter 17, and therefore the length of the trace on the oscillograph 5, will increase to a maximum and then decrease again within a frequency range of perhaps ± 5 cycles. The graduation mark 8 on the film 2 will accordingly be arrow-shaped at both ends, but will be quite narrow at its widest part. The tip of the arrow will however correspond very accurately with the graduation frequency, so that by the use of a needle point index or the like opposite the tip of the arrow, the frequency setting will be well within the ± 5 cycle limit. If desired masking arrangements may be provided so that only one end of the trace, for example, is marked on the film.

While a length of cinematograph film has been shown as an example of a scale to be graduated according to the invention, the same method could evidently be applied to a photographically sensitised dial plate or the like, of circular or other form.

It may be mentioned that the harmonic selector 12 might be omitted, if desired, all harmonics being simultaneously applied to the modulator 14. It would, however, be necessary carefully to select the frequency of the oscillator 15 in relation to the frequencies of the harmonics in order to avoid the possibility of more than one of them producing at the same time an output from 16 of the frequency which will be passed by the filter 17.

Figure 2 shows an alternative somewhat simpler method of graduating an oscillator scale, which is applicable when the oscillator is of the heterodyne type in which the output frequency is produced by heterodyning the outputs of two component oscillator circuits one of which has a fixed frequency and the other a variable frequency. The test oscillator 18 comprises an oscillator circuit 19 giving a fixed frequency of $F_1$, 650 kc. for example, and a variable frequency oscillator circuit 20 having a range of 500 to 651 kc. for example, both connected to a modulator 21 from which the output frequencies from zero to 150 kc., for example, can be obtained at 22. The calibration circuit comprises the three elements 9, 10 and 11 as in Figure 1. The output of 11 is connected to a low pass filter 23 cutting off at perhaps 200 kc., and this is connected to a balanced modulator 24 to which is also connected the output of the variable oscillator circuit 20, giving a frequency $f_1$. The output of the balanced modulator 24 is connected through a band pass filter 25 tuned to $F_1+1$ (651 kc.) to a second balanced modulator 26 to which is connected an oscillator 27 having a fixed frequency $F_2$ (755 kc.). The output of the balanced modulator 26 is connected to the oscillograph 5 through a highly selective band pass filter 28 tuned to $f_3=F_2-(F_1+1)$ (104 kc.). This filter is preferably a crystal filter to enable the desired degree of selectivity to be obtained. It will be understood that the elements 2, 3, 4, 5 and 7 which are not shown in Figure 2 may be the same as in Figure 1.

The process of obtaining the graduation is as follows:

The 1 kc. standard frequency being selected in the selector 10, the oscillator circuit 20 is first set approximately at 1 kc. on the negative side of zero, so that it generates approximately 651 kc. This does not need to be accurate and can be done by estimation. The low pass filter 23 is temporarily disconnected from the modulator 24, and on account of the small amount of carrier leak usually present, output at 651 kc. ($F_1+1$) will be applied through the filter 25 to the modulator 26. The frequency of the oscillator 27 is then adjusted accurately so that a trace of maximum length is obtained on the oscillograph screen. This ensures that the difference between the frequencies of the oscillators 20 and 27 is accurately equal to $f_3$ (104 kc.). The balanced modulator 24 may now be adjusted for minimum carrier leak by producing a trace of minimum length in the oscillograph screen. The filter 23 is now reconnected to the modulator 24 and the oscillator circuit 20 is adjusted towards the zero mark, the corresponding frequency being 650 kc. A trace will now be obtained substantially only when the upper side-band frequency (obtained when the 1 kc. harmonic from the filter 23 beats with the frequency from the oscillator 20) is again 651 kc. The zero graduation will thus be marked on the scale in the manner already explained with reference to Figure 1.

As the oscillator circuit 20 is continuously adjusted in the same direction, graduation lines spaced 1 kc. apart will be marked in turn on the scale. Each of these is produced from the harmonic which is 1 kc. higher in frequency than the frequency at the output 22 which corresponds to the graduation mark.

Having obtained this series of graduations, which really correspond to the frequencies of the oscillator circuit 20, it will be understood that in order to obtain the desired range of frequencies from 0 to 150 kc. at the output 22, it is necessary to adjust the fixed oscillator circuit 19 so that zero frequency output is obtained when the scale is set on the zero graduation mark. This is a standard adjustment, and is done with the help of the zero frequency detector which would be always provided as part of the oscillator 18. When this is done, the graduations will respectively correspond accurately with the output frequencies of the oscillator obtained at 22.

While the invention has been described in connection with the calibration and graduation of oscillators, to which it is specially applicable, it may also be applied to the graduation of the scale of other electrical instruments. For example, suppose that it is desired to graduate the scale of a continuously variable resistance in ohms. Then the scale being photographically sensitised, and being arranged with respect to the cathode ray tube in the manner explained, the resistance is connected in one arm of a calibrating Wheatstone bridge, in another arm of which is connected a reference standard which can be varied by a suitable selector switch in steps corresponding to the desired graduation values. A suitable direct operating voltage is applied to one pair of diagonal points of the bridge, and the output voltage appearing at the other pair of diagonal points is applied to one pair of deflecting plates of the oscillograph (after amplification in any convenient way if necessary), so that the beam is deflected well off the screen except when the bridge is balanced, the output voltage being then zero. When the variable resistance is adjusted through the balance value, the cathode beam will momentarily flick into view, and the spot will describe a narrow arrow-shaped path similar to that obtained in the oscillator graduating arrangement described above, which path will be photographically marked as on the scale, as before. The sudden reduction of the output voltage to zero is also caused to step up the selector switch, thus changing the reference standard value to that corresponding to the next graduation. It will be seen that if the variable resistance be continuously adjusted from one end of its scale to the other, a graduation line will be produced each time the bridge reaches the balance point, and the reference standard is prepared for the next graduation mark. The details of the arrangements for carrying out this process will be well understood by those skilled in the art, and therefore do not need fuller description.

What is claimed is:

1. An arrangement for graduating the scale of a variable frequency electrical oscillator having a continuously adjustable frequency-determining element, comprising a cathode ray oscillograph having beam deflection means and a screen, a length of sensitized cinematograph film, means for focusing light from said oscillograph screen on a portion of said film, means for simultaneously moving said adjustable frequency determining element and said film whereby said light strikes different portions of said film as the frequency of said oscillator is changed, a source of a plurality of calibration frequencies, means for selecting different ones of said calibration frequencies, means for comparing the frequency of said oscillator with the selected one of the calibration frequencies and producing an output when the compared frequencies are equal, and means for applying said output to the deflection means of said oscillograph to produce a trace on the oscillograph screen and on the film each time the frequency of the test oscillator becomes equal to one of the calibration frequencies as the frequency of the oscillator is being varied.

2. An arrangement according to claim 1, in which the comparing means comprises means for applying one of the said calibration frequencies to a balanced modulator having a local oscillator generating waves of frequency higher than the highest frequency generated by the oscillator to be graduated, means for applying the side bands from the said modulator to a second balanced modulator to which the last mentioned oscillator is applied to serve as the carrier wave source, and means for applying the side bands from the second modulator to a selective filter adapted to transmit substantially only the local oscillator frequency, the output of the said filter being applied to the deflecting means.

3. A calibration system for a source of variable frequency waves comprising a source of variable frequency waves, a source of a plurality of calibrated frequency waves, means for selecting a calibrated wave of a given frequency, a source of fixed frequency waves, balanced modulator means for modulating said fixed frequency waves with said selected calibrated frequency wave to obtain side band components, a second balanced modulator for modulating said side band components with said variable frequency waves to obtain a modulated output indicator means, means for selecting energy of the same frequency as said fixed frequency from said modulated output means, for applying said selected energy to said indicator means and means for adjusting the frequency of said variable frequency wave source to obtain a given indication on said indicator means.

4. An arrangement according to claim 3, wherein said indicator means comprises a length of film for reproducing said given indication, said variable frequency wave source comprising a frequency determining element mechanically coupled to said film whereby adjustment of said element produces a corresponding displacement of said film.

5. A system for calibrating an oscillator of the heterodyne type comprising a fixed oscillator and a variable oscillator producing variable frequency waves, a source of a plurality of calibrated frequency waves, means for modulating said variable frequency waves with said calibrated frequency waves to obtain a modulated output, means for deriving a given side band component from said modulated output, a source of second fixed frequency waves, means for modulating said second waves with said component to obtain a second modulated output, indicator means, means for selecting a given frequency wave from said second modulated output, means for applying said given frequency wave to said indicator.

6. An arrangement according to claim 5 comprising means for adjusting the frequency of said variable frequency oscillator to produce a given indication on said indicator means.

CHARLES TREVOR DALY.

REFERENCES CITED

The following references are of record in the file of this patent:

UNITED STATES PATENTS

| Number | Name | Date |
|---|---|---|
| 650,096 | Rodde | May 22, 1900 |
| 2,037,577 | Harries | Apr. 14, 1936 |
| 2,189,457 | Archer | Feb. 6, 1940 |
| 2,227,135 | Hollmann | Dec. 31, 1940 |
| 2,237,440 | Jones | Apr. 8, 1941 |
| 2,251,332 | Gray | Aug. 5, 1941 |
| 2,285,038 | Loughlin | June 2, 1942 |
| 2,307,505 | Heinmets | Jan. 5, 1943 |
| 2,422,386 | Anderson | June 17, 1947 |
| 2,436,235 | Sunstein | Feb. 17, 1948 |